US012626700B2

(12) United States Patent
Lokanath et al.

(10) Patent No.:  US 12,626,700 B2
(45) Date of Patent:       May 12, 2026

(54) METHOD AND SYSTEM FOR IDENTIFYING A VOICE COMMAND IN A CONTINUOUS LISTENING IOT ENVIRONMENT

(71) Applicant: SAMSUNG ELECTRONICS CO., LTD., Suwon-si (KR)

(72) Inventors: Manjunath Belgod Lokanath, Bengaluru (IN); Vinay Vasanth Patage, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 18/537,329

(22) Filed: Dec. 12, 2023

(65) Prior Publication Data

US 2024/0233722 A1     Jul. 11, 2024

Related U.S. Application Data

(63) Continuation of application No. PCT/IB2023/061823, filed on Nov. 23, 2023.

(30) Foreign Application Priority Data

Jan. 5, 2023     (IN) ............................. 202341001155

(51) Int. Cl.
*G10L 15/30*          (2013.01)
*G10L 15/22*          (2006.01)

(52) U.S. Cl.
CPC ........ *G10L 15/22* (2013.01); *G10L 2015/223* (2013.01)

(58) Field of Classification Search
CPC .......... G10L 15/22; G10L 15/30; G06F 3/167
See application file for complete search history.

(56) References Cited

U.S. PATENT DOCUMENTS 10,026,401 B1 *   7/2018   Mutagi ................... G06F 3/167
10,573,171 B2     2/2020   VanBlon et al.
(Continued)

FOREIGN PATENT DOCUMENTS

JP         2006-324742 A     11/2006
WO       2018/067350 A1      4/2018

OTHER PUBLICATIONS

International Search Report (PCT/ISA/210) and Written Opinion (PCT/ISA/237) issued by the International Searching Authority on Mar. 11, 2024 in corresponding International Application No. PCT/IB2023/061823.

(Continued)

*Primary Examiner* — Daniel Abebe
(74) *Attorney, Agent, or Firm* — Sughrue Mion, PLLC

(57)                    ABSTRACT

A method for identifying and executing a voice command in a continuous listening Internet of Things (IoT) environment, may include: receiving, by at least one IoT device, a voice input in the continuous listening IoT environment; detecting, by the at least one IoT device, an occurrence of at least one non-speech event in a vicinity of at least one other IoT device in the continuous listening IoT environment; determining, by the at least one IoT device, an ambient context associated with the at least one non-speech event; determining, by the at least one IoT device, a correlation between the ambient context and the at least one other IoT device based on an event location of the occurrence of the at least one non-speech event; and determining, by the at least one IoT device, presence of at least one voice command within the voice input based on the correlation.

14 Claims, 14 Drawing Sheets

100

(56) References Cited

U.S. PATENT DOCUMENTS

| | | | | |
|---|---|---|---|---|
| 10,593,326 | B2 * | 3/2020 | Teasley | G10L 15/22 |
| 11,223,497 | B2 | 1/2022 | Hong et al. | |
| 11,455,994 | B1 * | 9/2022 | Blanksteen | G06F 3/165 |
| 11,636,861 | B2 | 4/2023 | Kim et al. | |
| 2015/0100313 | A1 | 4/2015 | Sharma | |
| 2019/0044745 | A1 | 2/2019 | Knudson et al. | |
| 2020/0294503 | A1 | 9/2020 | Ryu et al. | |
| 2021/0090567 | A1 | 3/2021 | Tukka et al. | |
| 2021/0217423 | A1 | 7/2021 | Rakshit | |
| 2021/0249010 | A1 * | 8/2021 | Tayshete | G10L 15/22 |
| 2021/0335354 | A1 | 10/2021 | Park | |
| 2022/0310089 | A1 | 9/2022 | Aleksic et al. | |
| 2022/0343909 | A1 * | 10/2022 | Lee | G06F 3/167 |

OTHER PUBLICATIONS

Communication issued on Jun. 5, 2025 by the European Patent Office in European Patent Application No. 23914634.3.

Communication issued on Aug. 4, 2025 by the Intellectual Property India in Indian Patent Application No. 202341001155.

Communication dated Mar. 12, 2026, issued by the European Patent Office in European Application No. 23 914 634.3.

* cited by examiner

FIG. 1C

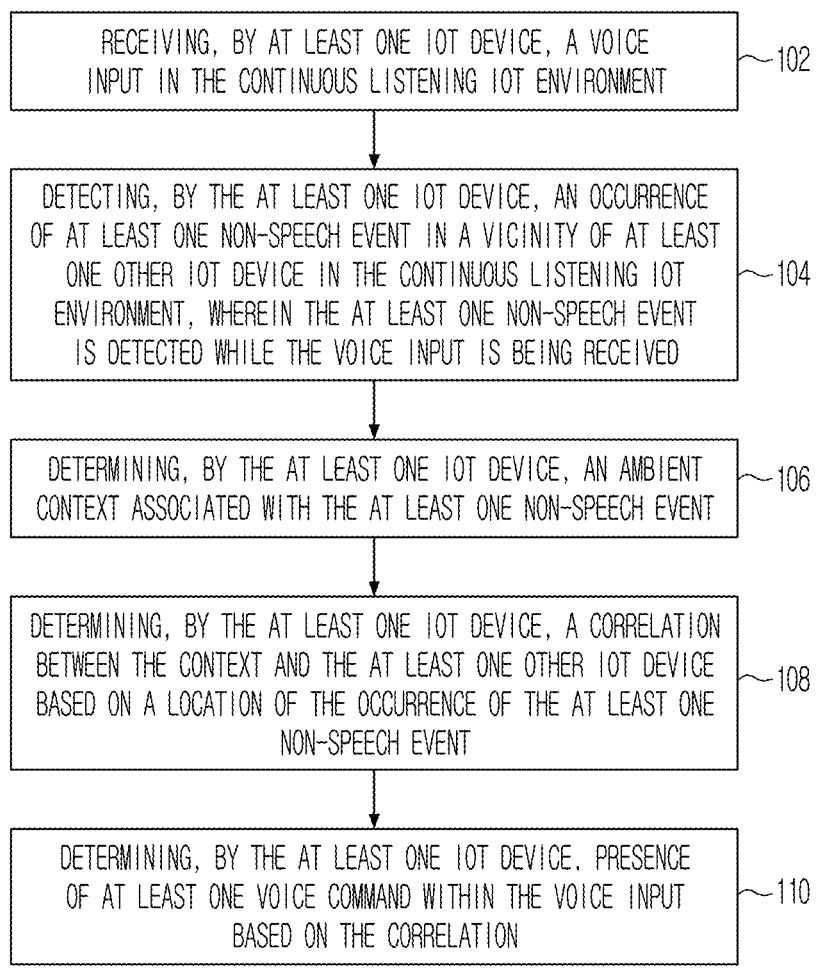

100

RECEIVING, BY AT LEAST ONE IOT DEVICE, A VOICE
INPUT IN THE CONTINUOUS LISTENING IOT ENVIRONMENT ∼102

DETECTING, BY THE AT LEAST ONE IOT DEVICE, AN OCCURRENCE
OF AT LEAST ONE NON-SPEECH EVENT IN A VICINITY OF AT LEAST
ONE OTHER IOT DEVICE IN THE CONTINUOUS LISTENING IOT
ENVIRONMENT, WHEREIN THE AT LEAST ONE NON-SPEECH EVENT
IS DETECTED WHILE THE VOICE INPUT IS BEING RECEIVED ∼104

DETERMINING, BY THE AT LEAST ONE IOT DEVICE, AN AMBIENT
CONTEXT ASSOCIATED WITH THE AT LEAST ONE NON-SPEECH EVENT ∼106

DETERMINING, BY THE AT LEAST ONE IOT DEVICE, A CORRELATION
BETWEEN THE CONTEXT AND THE AT LEAST ONE OTHER IOT DEVICE
BASED ON A LOCATION OF THE OCCURRENCE OF THE AT LEAST ONE
NON-SPEECH EVENT ∼108

DETERMINING, BY THE AT LEAST ONE IOT DEVICE, PRESENCE
OF AT LEAST ONE VOICE COMMAND WITHIN THE VOICE INPUT
BASED ON THE CORRELATION ∼110

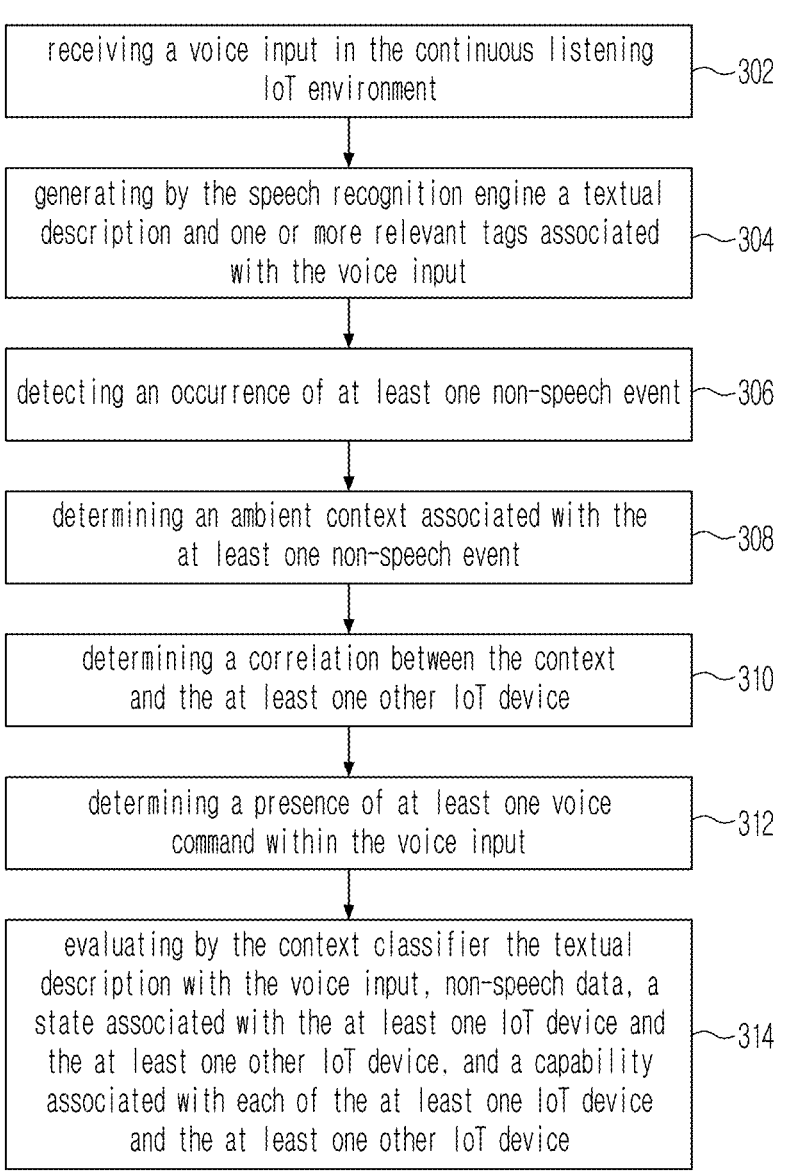

300 receiving a voice input in the continuous listening
IoT environment ～302 generating by the speech recognition engine a textual
description and one or more relevant tags associated
with the voice input ～304 detecting an occurrence of at least one non-speech event ～306 determining an ambient context associated with the
at least one non-speech event ～308 determining a correlation between the context
and the at least one other IoT device ～310 determining a presence of at least one voice
command within the voice input ～312 evaluating by the context classifier the textual
description with the voice input, non-speech data, a
state associated with the at least one IoT device and
the at least one other IoT device, and a capability
associated with each of the at least one IoT device
and the at least one other IoT device ～314

FIG. 9A
(RELATED ART)
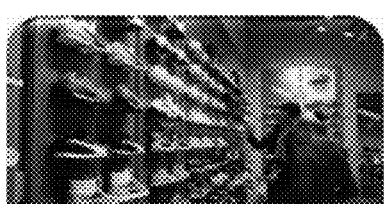
People are shopping at
a corner of shop and
having chit chat
Shop owner
identifies that the
corner is poorly lit
Shop owner provides
contextual continuous
listening command to
near by laptop
Increase brightness
in that corner
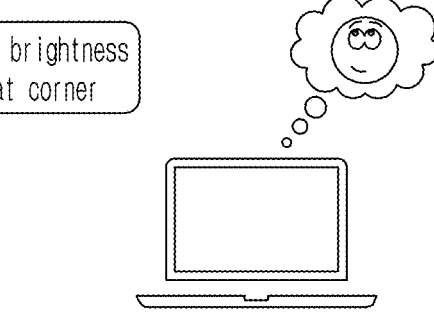
Existing system

FIG. 9B
People are shopping shoes at a
corner of shop and having chit chat
Shop owner identifies that
the corner is poorly lit
Increase brightness
in that corner
Smart lights brightness
is increased at
identified corner
Smart lights
in shops corner

FIG. 10A
(RELATED ART)
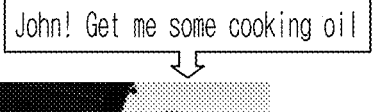
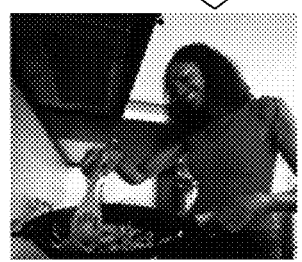
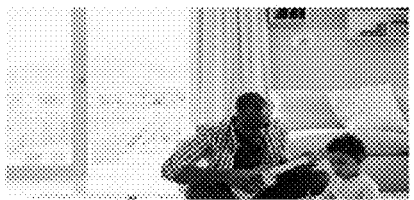
Dad is playing in living room
with his kid
Mom calls out dad saying
something
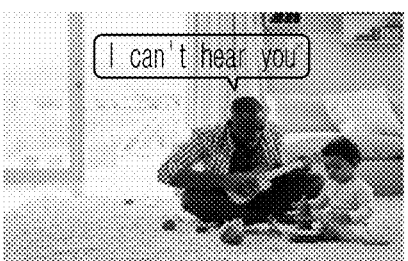
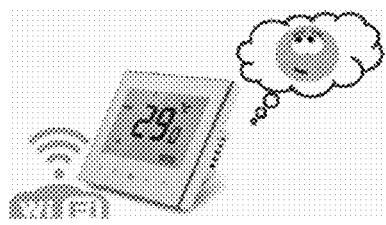
Dad can't hear what mom said
due to high chimney noise
Nearby thermostat heard
it but did nothing

FIG. 10B
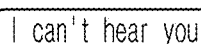
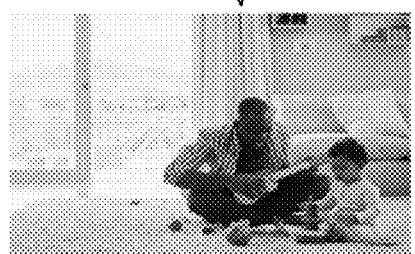
Dad can' t hear what mom said
due to high chimney noise
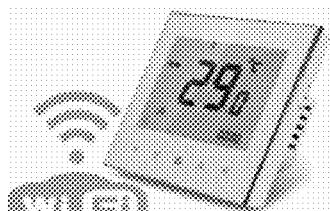
Nearby thermostat heard it
and lowered chimney fan speed,
informing mom about it.
Mom now can call dad again
With her voice being audible
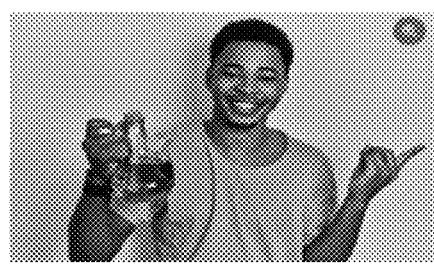
Happy dad because of smart
thermostat contextual action

METHOD AND SYSTEM FOR IDENTIFYING A VOICE COMMAND IN A CONTINUOUS LISTENING IOT ENVIRONMENT

CROSS-REFERENCE TO RELATED APPLICATIONS

This application is a bypass continuation of International Application No. PCT/IB2023/061823, filed on Nov. 23, 2023, which is based on and claims priority to India Patent Application No. 202341001155, filed on Jan. 5, 2023, in Intellectual Property India, the disclosures of which are incorporated by reference herein in their entireties.

BACKGROUND

1. Field

The disclosure generally relates to field of voice recognition, and more particularly to a method and system for identifying a voice command in a continuous Internet of Things (IoT) environment.

2. Description of Related Art

Continuous listening is an upcoming technology, where a voice-assistant can be interacted without saying the 'wakeup word' like 'Hi Bixby', 'Ok Google', 'Alexa' etc. This continuous listening classification model relies on command vs conversation identification to identify and wakeup itself for the command. Such a classification model supports limited actions and is dynamically non-scalable. Such a conventional model will also fail to recognize the user surrounding to dynamically scale itself for command vs conversation classification, hence, degrading the performance and the user experience. Such a conventional model fails to recognize the non-speech event references in case of contextual commands.

According to conventional system, the conventional command will reject the contextual utterance of user, as it will not be able to identify the non-speech event as a context accurately.

FIGS. 1A and 1B illustrates various problem scenarios according to the related art. As can be seen in (A) of the FIGS. 1A and 1B the user is in a laundry room and in the meantime the baby starts crying in a bedroom. The user has provided a command "Play Lullaby". However, as the user is interacting with a smart washing machine that is incapable of performing the command. Hence fails to recognize the command. Thus, the smart washing machine rejects the command as it does not support the given command. According to another example scenario as shown in the (B) of the FIGS. 1A and 1B, one user is playing in a living room, and another user is working in a kitchen. The user who is in the kitchen starts conversation with the user in the living room. However, the user in the living room replied that he cannot hear the voice of the user who is in the kitchen. In a smart home environment, one or more smart devices are connected with each other and are capable of interacting with each other. However, in the scenario as depicted in (B) of the FIGS. 1A and 1B, the smart devices that is near to the user in the living room is unable to classify any contextual utterance/contextual command of the user. Thus, any command being the part of any on-going conversation is being rejected as the nearby smart devices does not support such command. Accordingly, the command provided by the user in the living room may be rejected by nearby the smart devices.

In related art solutions, the classification model fails to recognize a part of any on-going conversation as a command in correlation to the non-speech event happening in the vicinity of the user.

Thus, there is a need to overcome above-mentioned drawbacks.

SUMMARY

Provided are a method and a system for identifying and executing a voice command in a continuous listening Internet of Things (IoT) environment.

Additional aspects will be set forth in part in the description which follows and, in part, will be apparent from the description, or may be learned by practice of the presented embodiments.

According to an aspect of the disclosure, a method for identifying and executing a voice command in a continuous listening Internet of Things (IoT) environment, may include: receiving, by at least one IoT device, a voice input in the continuous listening IoT environment; detecting, by the at least one IoT device, an occurrence of at least one non-speech event in a vicinity of at least one other IoT device in the continuous listening IoT environment, wherein the at least one non-speech event is detected while the voice input is being received; determining, by the at least one IoT device, an ambient context associated with the at least one non-speech event: determining, by the at least one IoT device, a correlation between the ambient context and the at least one other IoT device based on an event location of the occurrence of the at least one non-speech event: determining, by the at least one IoT device, presence of at least one voice command within the voice input based on the correlation: and by the at least one IoT device, executing the at least one voice command, or instructing the at least one other IoT device to execute the at least one voice command.

The ambient context of the at least one non-speech event may be determined based on one or more of the event location, a user attention, and a type of the at least one non-speech event.

The method may include transmitting, by continuous listening, the voice input for speech recognition upon receiving the voice input.

The method may include generating a textual description and one or more relevant tags associated with the voice input based on performing a voice activity detection and an automatic speech recognition.

The one or more relevant tags may include information of a point of interest, a time, and a noun and one or more other parts of speech associated with the voice input.

Detecting the occurrence of the at least one non-speech event may include: detecting one or more non-speech sounds while the voice input is being received: and marking the one or more non-speech sounds with a user attention level indicating a degree of urgency associated with the one or more non-speech sounds.

The determining the correlation may include: feeding, to an Artificial Intelligence (AI), the at least one non-speech event, the ambient context, and a state of the at least one other IoT device that is present at the event location based on the voice input being received: and determining, by the AI, the correlation between the ambient context and the at least one other IoT device based on the event location, an urgency associated with the at least one non-speech event and the state of the at least one other IoT device.

The at least one non-speech event may occur at a physical location of the at least one other IoT device.

The method may include generating a relational table of available IoT devices that are capable of executing the at least one voice command.

Determining that the voice input includes the at least one voice command includes: receiving a textual description associated with the voice input: determining that the textual description associated with the voice input comprises the at least one voice command or not; evaluating, in response to determining that the textual description associated with the voice input is the at least one voice command, the textual description associated with the voice input, the at least one non-speech event, a first state of the at least one IoT device, a second state of the at least one other IoT device, and a first capability associated with each of the at least one IoT device, and a second capability associated with the at least one other IoT device; and generating a probable outcome indicating that the voice input comprises the at least one voice command based on the evaluating.

The voice input, non-speech data, the first state and the second state, and the first capability and the second capability may be fetched from a dynamic IoT mesh.

The method may further include: capturing, by a dynamic IoT mesh upon determining that the textual description is the voice command from the at least one IoT device in the continuous listening IoT environment, the at least one non-speech event, the first state, one or more operational capabilities associated with the at least one IoT device, one or more non-speech sounds associated with the occurrence of the at least one non-speech event, a user attention associated with the one or more non-speech sounds, the event location, and a physical location of the at least one IoT device.

The at least one non-speech event may be an event with a degree of urgency where a non-speech sound is produced in the continuous listening IoT environment by one or more a person, an animal, a device, and a machine.

The occurrence of the at least one non-speech event in a vicinity of the at least one other IoT device may be based on one or more non-speech sounds in the continuous listening IoT environment.

The at least one voice command within the voice input may be an implicit command from a user.

According to an aspect of the disclosure, a system for identifying and executing a voice command in a continuous listening Internet of Things (IoT environment), may include: at least one IoT device configured to receive a voice input in the continuous listening IoT environment. The at least one IoT device may include: a memory storing instructions; and at least one processor operatively connected to the memory and configured to execute the instructions to: receive the voice input in the continuous listening IoT environment; detect an occurrence of at least one non-speech event in a vicinity of the at least one other IoT device in the continuous listening IoT environment, wherein the at least one non-speech event is detected while the voice input is being received: determine an ambient context associated with the at least one non-speech event: determine a correlation between the ambient context and the at least one other IoT device based on an event location of the occurrence of the at least one non-speech event: determine presence of at least one voice command within the voice input based on the correlation; and execute the at least one voice command, or instructing the at least one other IoT device to execute the at least one voice command.

Determining the correlation may include: feeding, to an Artificial Intelligence (AI), the at least one non-speech event, the ambient context, and a state of the at least one other IoT device that is present at the event location based on the voice input being received; and determining, by the AI, the correlation between the ambient context and the at least one other IoT device based on the event location, an urgency associated with the at least one non-speech event and the state of the at least one other IoT device.

The at least one non-speech event may occur at a physical location of the at least one other IoT device.

The at least one processor may be further configured to execute the instructions to: generate a relational table of available IoT devices that are capable of executing the at least one voice command.

The at least one voice command within the voice input may be an implicit command from a user.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1C illustrates a block diagram depicting a method for identifying a voice command in a continuous listening Internet of Things (IoT) environment, in accordance with an embodiment of the disclosure:

FIG. 3 illustrates an operational flow diagram depicting a process for identifying a voice command in a continuous listening Internet of Things (IoT) environment, in accordance with an embodiment of the disclosure:

FIG. 8 illustrates an architectural diagram 800 of the device resolution engine 228, in accordance with an embodiment of the disclosure:

FIG. 9A illustrates a related art system:

FIG. 9B illustrates an embodiment of the disclosure for comparison with FIG. 9A;

FIG. 10A illustrates a related art system; and

FIG. 10B illustrates an embodiment of the disclosure for comparison with FIG. 10A.

DETAILED DESCRIPTION

Example embodiments of the disclosure are described below with reference to drawings. It is understood that no limitation of the scope of the disclosure is thereby intended, such alterations and further modifications in disclosed embodiments, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", "includes", "including", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Figure 1A:
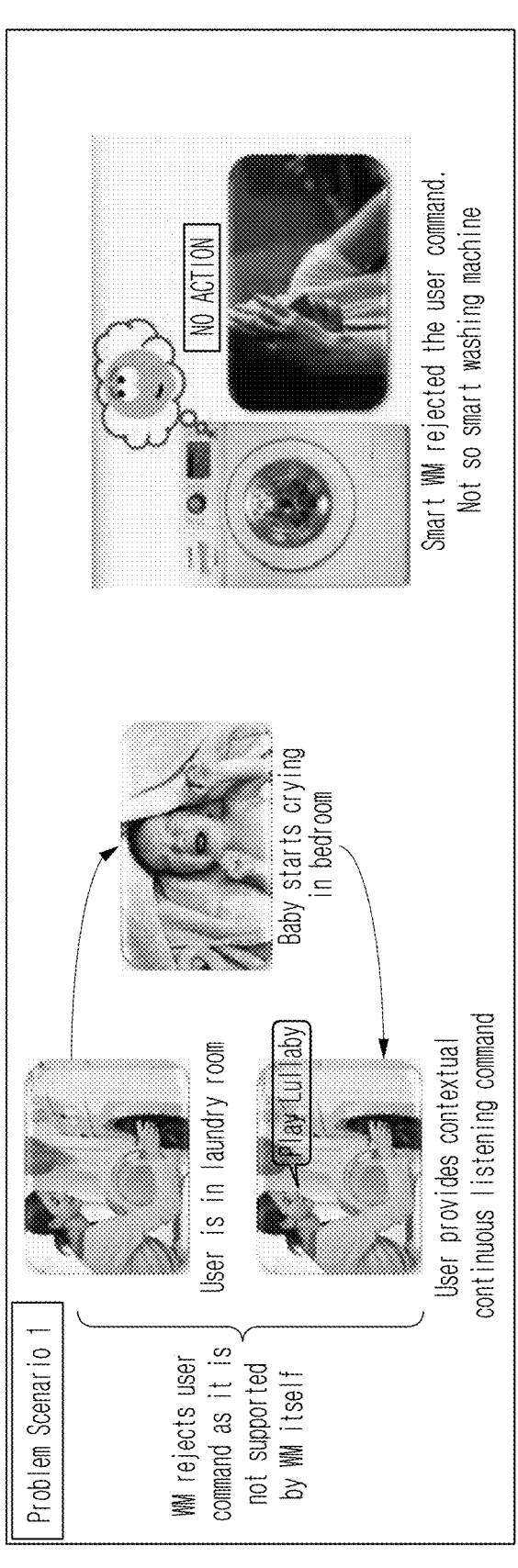
FIG. 1A illustrates various problem scenarios according to the related art.

FIG. 1C illustrates a block diagram depicting a method 100 for identifying a voice command in a continuous listening Internet of Things (IoT) environment, in accordance with an embodiment of the disclosure.

At block 102, the method 100 includes receiving, by at least one IoT device, a voice input in the continuous listening IoT environment.

At block 104, the method 100 includes detecting, by the at least one IoT device, an occurrence of at least one non-speech event in a vicinity of at least one other IoT device in the continuous listening IoT environment, wherein the at least one non-speech event is detected while the voice input is being received.

At block 106, the method 100 includes determining, by the at least one IoT device, an ambient context associated with the at least one non-speech event.

At block 108, the method 100 includes determining, by the at least one IoT device, a correlation between the context and the at least one other IoT device based on a location of the occurrence of the at least one non-speech event.

At block 110, the method 100 includes determining, by the at least one IoT device, presence of at least one voice command within the voice input based on the correlation.

Figure 2:
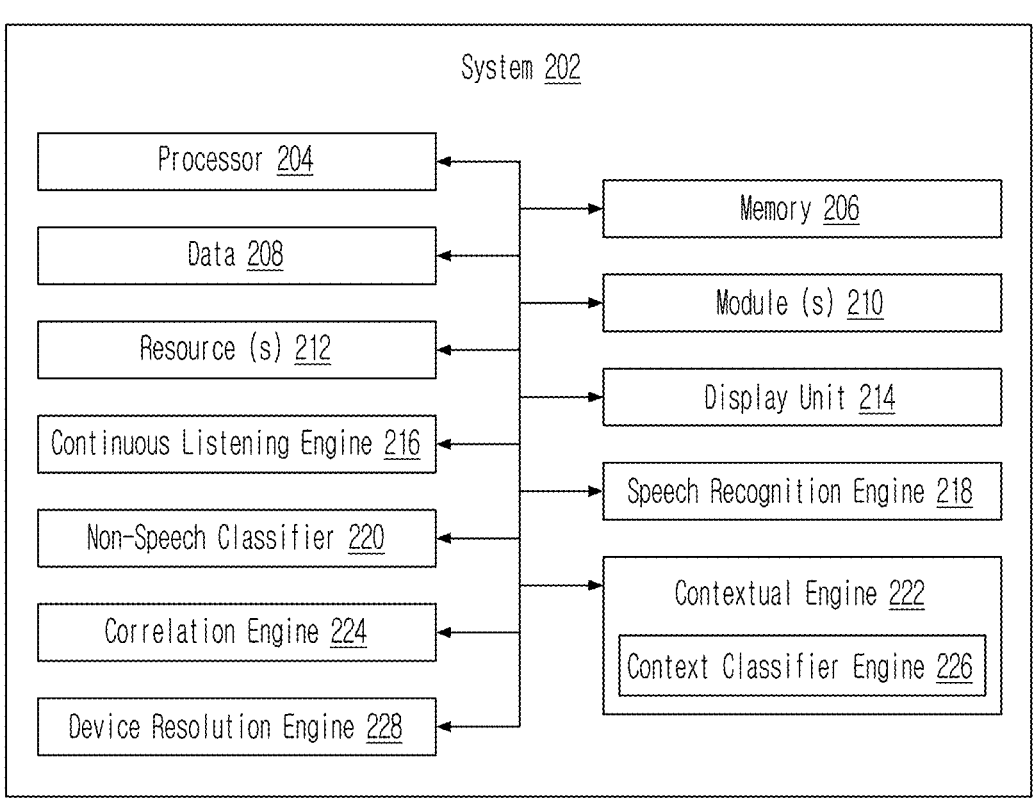
FIG. 2 illustrates a schematic block diagram of the system configured to identify a voice command in a continuous listening Internet of Things (IoT) environment, in accordance with an embodiment of the disclosure.

FIG. 2 illustrates a schematic block diagram 200 of the system 202 configured to identify a voice command in a continuous listening Internet of Things (IoT) environment, in accordance with an embodiment of the disclosure. The system 104 may be incorporated in one or more IoT devices amongst a number of IoT devices. The number of IoT devices may be present in the continuous listening IoT environment. The system may be configured to identify the voice command by monitoring on going conversations in the continuous listening IoT environment.

The system 202 may include a processor 204 (or plurality of processors), a memory 206, data 208, module (s) 210, resource (s) 212, a display unit 214, a continuous listening engine 216, a speech recognition engine 218, a non-speech classifier 220, a contextual engine 222, a correlation engine 224, a context classifier engine 226, and a device resolution engine 228.

In an embodiment, the processor 204, the memory 206, the data 208, the module (s) 210, the resource (s) 212, the display unit 214, the continuous listening engine 216, the speech recognition engine 218, the non-speech classifier 220, the contextual engine 222, the correlation engine 224, the context classifier engine 226, and the device resolution engine 228 may be communicably coupled to one another.

As would be appreciated, the system 202, may be understood as one or more of a hardware, a software, a logic-based program, a configurable hardware, and the like. In an example, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data stored in the memory 206. According to alternate embodiment, the continuous listening engine 216, the speech recognition engine 218, the non-speech classifier 220, the contextual engine 222, the correlation engine 224, the context classifier engine 226, and the device resolution engine 228 may be implemented in the processor (or plurality of processors) 204.

In an example, the memory 206 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 206 may include the data 208. The data 208 serves, amongst other things, as a repository for storing data processed, received, and generated by one or more of the processor 204, the memory 206, the module (s) 210, the resource (s) 212, the display unit 214, the continuous listening engine 216, the speech recognition engine 218, the non-speech classifier 220, the contextual engine 222, the correlation engine 224, the context classifier engine 226, and the device resolution engine 228.

The module(s) 210, amongst other things, may include routines, programs, objects, components, data structures, etc., which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the disclosure, the module(s) 210 may be machine-readable instructions (software) which, when executed by a processor/processing unit, may perform any of the described functionalities.

In some example embodiments, the module(s) 210 may be machine-readable instructions (software) which, when executed by a processor 204/processing unit, perform any of the described functionalities.

The resource(s) 210 may be physical and/or virtual components of the system 202 that provide inherent capabilities and/or contribute towards the performance of the system 202. Examples of the resource(s) 210 may include, but are not limited to, a memory (e.g., the memory 206), a power unit (e.g., a battery), a display unit (e.g., the display unit 214) etc. The resource(s) 210 may include a power unit/battery unit, a network unit, etc., in addition to the processor 204, and the memory 206.

Figure 1B:
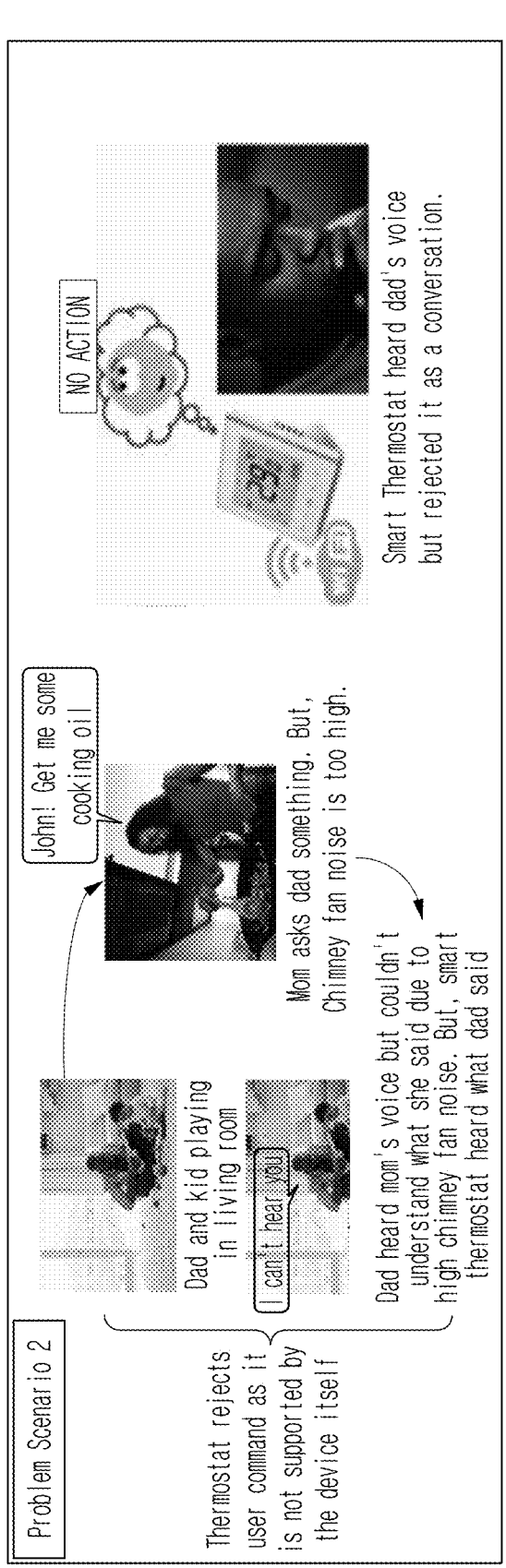
FIG. 1B illustrates various problem scenarios according to the related art.

The display unit 214 may display various types of information (for example, media contents, multimedia data, text data, etc.) to the system 202. The display unit 214 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display. A detailed working of each of the component as disclosed in the FIG. 2 will be explained in conjunction with the FIGS. 1A and 1B.

According to embodiment, the continuous listening engine 216 may be configured to receive a voice input in the continuous listening IoT environment as shown in the operation 102. Upon receiving the voice input, the continuous listening engine 216 may be configured to transmit the voice input to the speech recognition engine 218. Thereafter, the speech recognition engine 218 may be configured to generate a textual description and one or more relevant tags associated with the voice input received from the continuous listening engine 216. The textual description and the one or more relevant tags may be generated based on performing a voice activity detection and an automatic speech recognition on the voice input. In a non-limiting example, the one or more relevant tags may include information such as a point of interest, a time, and a noun and one or more other parts of speech associated with the voice input.

According to embodiment, the speech recognition engine 218 may include a number of modules such as a Voice Activity Detection (VAD) module and an Automatic Speech Recognition (ASR) module. The VAD module may be configured to identify and consider only valid human voice for transcription and the ASR module may be configured to convert the detected human voice audio into a tagged text. An output may be a transcription of human voice heard continuously.

Subsequent to reception of the voice input by the continuous listening engine 216, the non-speech classifier 220 may be configured to detect an occurrence of at least one non-speech event. The occurrence of the at least one nonspeech event may be detected in a vicinity of at least one other IoT device in the continuous listening IoT environment. Further, the non-speech classifier 220 may be configured to detect the occurrence of the at least one non-speech event while receiving the voice input. In an embodiment, the at least one non-speech event may be received as a background sound with respect to the voice input. The at least one non-speech event may be an event with a degree of urgency where a non-speech sound is produced in the continuous listening IoT environment by one or more a person, an animal, a device, and a machine. Subsequently, for detecting the occurrence of the at least one non-speech event, the non-speech classifier 220 may be configured to detect one or more non-speech sounds while the voice input is being received. Upon receiving the one or more non-speech sounds, the non-speech classifier 220 may be configured to mark the one or more non-speech sounds with a user attention level. The user attention level may indicate a degree of urgency associated with the one or more non-speech sounds.

In response to detection of the occurrence of the at least one non-speech event, the contextual engine 222 may be configured to determine an ambient context associated with the at least one non-speech event. The ambient context of the at least one non-speech event may be determined based on one or more of a location of the occurrence of the at least one non-speech event, a user attention, and a type of at least one non-speech event. The contextual engine 222 may be an AI based engine including a First Pass Detector (FPD), and a Second Pass Detector (SPC).

After determining the ambient context, the correlation engine 224 may be configured to determine a correlation between the context and the at least one other IoT device. The correlation may be based on a location of the occurrence of the at least one non-speech event. For determining the correlation, the correlation engine 224 may be configured to feed the at least one non-speech event and the context, and a state of the at least one other IoT device present at a location of the occurrence of the at least one non-speech event when the voice input is received to an Artificial Intelligence (AI) engine.

Further, the AI engine may be configured to determine the correlation between the context and the at least one other IoT device based on the location associated with the at least one non-speech event, an urgency associated with the at least one non-speech event and the state of the at least one other IoT device. The at least one non-speech event may occur in a vicinity of the location of the at least one other IoT device. In an embodiment, the AI engine may be incorporated in the correlation engine 224.

In an embodiment, the correlation engine 224 may be configured to generate an impact table of the at least one non-speech sound event vs IoT devices states, and capabilities based on the identified location of the at least one non-speech sound event. Information required to generate the impact table may be received by a dynamic IoT mesh network. In an exemplary embodiment, where a baby is crying, the correlation engine 224 may be configured to generate a table of a non-speech sound event of a 'baby crying' received from connected device(s) to the corresponding IoT devices, it's states (turned ON) and capabilities (playing or streaming music) to be able to respond to the identified non-speech sound event. The table 1 depicts an example of a table generated by the correlation engine. The impact table is a relational table of available IoT devices that are capable of executing the determined voice command.

TABLE 1 depicts a table generated by the correlation engine 224

USER SCENE CORRELATION - IMPACT TABLE

| NON-SPEECH EVENT | NON-SPEECH EVENT LOCATION | IOT DEVICES IN BEDROOM | IOT DEVICES STATES | IMPACTFUL CAPABILITIES |
|---|---|---|---|---|
| BABY CRYING (IMMIDIATE) | BEDROOM | SPEACKER | ON | MUSIC, SMART VOICE ASSISTANT |
| | | LIGHTS | ON | TURN ON/OFF |
| | | TV | OFF | MUSIC, TV, VIDEO, SMART ASSISTANT |
| | | AC | ON | TEMP. CONTROL |

Furthermore, the context classifier engine 226 may be configured to determine a presence of at least one voice command within the voice input based on the correlation. For determining that the voice input includes the at least one voice command, the context classifier engine 226 may be configured to receive a textual description associated with the continuous voice input from the speech recognition engine 218. Upon receiving the textual description, the context classifier engine 226 may be configured to determine whether the textual description associated with the continuous voice input includes the voice command.

In response to determining that the textual description associated with the voice input includes the voice command, the context classifier engine 226 may be configured to evaluate the textual description with the voice input, non-speech data, a state associated with the at least one IoT device and the at least one other IoT device, and a capability associated with each of the at least one IoT device and the at least one other IoT device. The voice input, non-speech data, the state associated with the at least one IoT device and the at least one other IoT device, and the capability associated with each of the at least one IoT device and the at least one other IoT device may be fetched from a dynamic IoT mesh. According to an embodiment, the dynamic IoT mesh includes one or more IoT devices that are interconnected with each other in the IoT environment.

The dynamic IoT mesh may be configured to capture from one or more IoT devices in the continuous listening IoT environment, the at least one non-speech event, a state associated with the one or more IoT devices, one or more operational capabilities associated with one or more IoT devices one or more non-speech sounds associated with the occurrence of the at least one non-speech event, a user attention associated with the one or more non-speech sounds, a location associated with the occurrence of the at least one non-speech event and a physical location of the at least one IoT device upon determining that the textual description includes the voice command. Thereafter, the context classifier engine 226 may be configured to generate a probable outcome indicating that the voice input includes the at least one voice command.

Further, the device resolution engine 228, on determining a user action match, is configured to compute one or more parameter values of at the least one IoT device related to handle the voice command that is given by the user. Based on the connected IoT devices states and capabilities, the identified command is required to be resolved to determine the response action as well as response target device. The device resolution engine 228 intelligently identifies the action to be taken on at least one of the IoT devices based on identified user voice command and configure the parameter to produce impact of user response based on non-speech sound event.

FIG. 3 illustrates an operational flow diagram depicting a process 300 for identifying a voice command in a continuous listening Internet of Things (IoT) environment, in accordance with an embodiment of the disclosure. The process 300 may be performed by the system 202 as referred in the FIG. 2. Further, the process 300 may be implemented in one or more IoT devices amongst a number of IoT devices. The number of IoT devices may be present in the continuous listening IoT environment.

At operation 302, the process 300 may include receiving a voice input in the continuous listening IoT environment. The voice input may be received by the continuous listening engine 216 as referred in the FIG. 2. The process 300 may further include transmitting the voice input to the speech recognition engine 218 as referred in the FIG. 2.

At operation 304, the process 300 may include generating by the speech recognition engine 218 a textual description and one or more relevant tags associated with the voice input received from the continuous listening engine 216. The textual description and the one or more relevant tags may be generated based on performing a voice activity detection and an automatic speech recognition on the voice input. The one or more relevant tags may include information such as a point of interest, a time, and a noun and one or more other parts of speech associated with the voice input.

At operation 306, the process 300 may include detecting an occurrence of at least one non-speech event. The occurrence of the at least one non-speech event may be detected in a vicinity of at least one other IoT device in the continuous listening IoT environment by the non-speech classifier 220 as referred in the FIG. 2. The occurrence of the at least one non-speech event may be detected while reception of the voice input. In an embodiment, the at least one non-speech event may be received as a background sound with respect to the voice input. The at least one non-speech event may be an event with a degree of urgency where a non-speech sound is produced in the continuous listening IoT environment by one or more a person, an animal, a device, and a machine or any other external source of sound. For detecting the occurrence, the process 300 may include detecting one or more non-speech sounds while the voice input is being received. Further, the process 300 may include marking the one or more non-speech sounds with a user attention level. The user attention level may indicate a degree of urgency associated with the one or more non-speech sounds.

At operation 308, the process 300 may include determining an ambient context associated with the at least one non-speech event. The ambient context of the at least one non-speech event may be determined based on one or more of a location of the occurrence of the at least one non-speech event, a user attention, and a type of at least one non-speech event by the contextual engine 222 as referred in the FIG. 2.

At operation 310, the process 300 may include determining a correlation between the context and the at least one other IoT device. The correlation may be based on a location of the occurrence of the at least one non-speech event, further the correlation may be determined by the correlation engine 224 as referred in the FIG. 2. Determining the correlation may include feeding the at least one non-speech event and the context, and a state of the at least one other IoT device present at a location of the occurrence of the at least one non-speech event when the voice input is received to an AI engine. Further, the process 300 may include determining by the AI engine the correlation between the context and the at least one other IoT device based on the location associated with the at least one non-speech event, an urgency associated with the at least one non-speech event and the state of the at least one other IoT device. The at least one non-speech event may occur at the location of the at least one other IoT device. In an embodiment, the AI engine may be incorporated in the correlation engine 224.

At operation 312, the process 300 may include determining a presence of at least one voice command within the voice input based on the correlation by the context classifier as referred in the FIG. 2. For determining that the voice input includes the at least one voice command, the process 300 may include receiving the textual description associated with the voice input from the speech recognition engine 218. Upon reception of the textual description, the process 300 may include determining whether the textual description associated with the voice input includes the voice command.

At operation 314, the process 300 may include evaluating by the context classifier the textual description with the voice input, non-speech data, a state associated with the at least one IoT device and the at least one other IoT device, and a capability associated with each of the at least one IoT device and the at least one other IoT device. The voice input, non-speech data, the state associated with the at least one IoT device and the at least one other IoT device, and the capability associated with each of the at least one IoT device and the at least one other IoT device may be fetched from a dynamic IoT mesh.

The dynamic IoT mesh may be configured to capture from one or more IoT devices in the continuous listening IoT environment, the at least one non-speech event, a state associated with the one or more IoT devices, one or more operational capabilities associated with one or more IoT devices one or more non-speech sounds associated with the occurrence of the at least one non-speech event, a user attention associated with the one or more non-speech sounds, a location associated with the occurrence of the at least one non-speech event and a physical location of the at least one IoT device upon determining that the textual description includes the voice command. According to an embodiment, the process 300 may include generating a probable outcome indicating that the voice input includes the at least one voice command. Further, the process 300 may include computing one or more parameter values of at the least one IoT device related to handle the voice command. The one or more parameter values may automatically be configured on the at least one IoT device.

Figure 4:
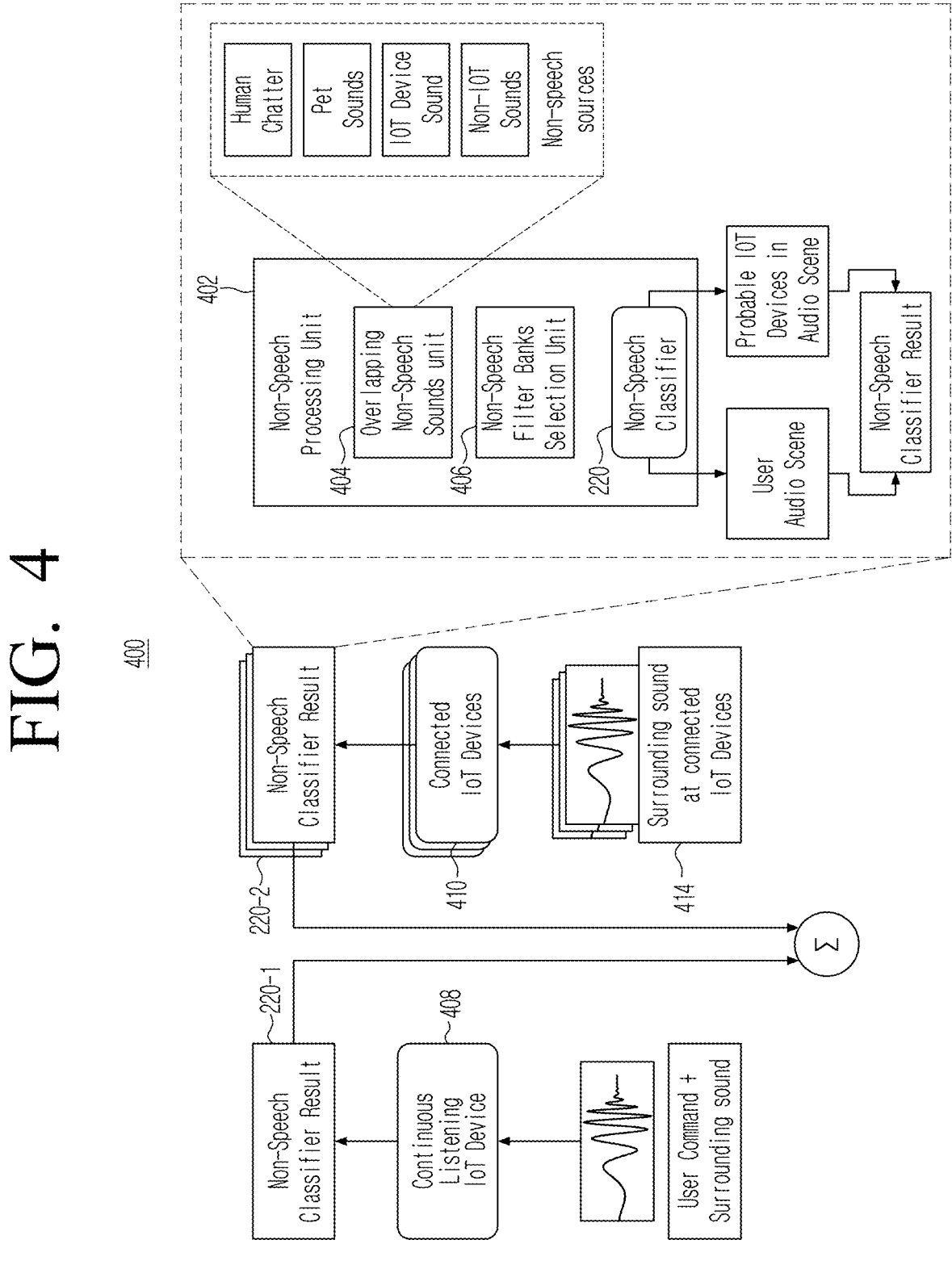
FIG. 4 illustrates an operational flow diagram depicting a process for detecting an occurrence of at least one non-speech event in a vicinity of at least one other IoT device in the continuous listening IoT environment, in accordance with an embodiment of the disclosure.

FIG. 4 illustrates an operational flow diagram depicting a process 400 for detecting an occurrence of at least one non-speech event in a vicinity of at least one other IoT device in the continuous listening IoT environment, in accordance with an embodiment of the disclosure. The process 400 may be performed by the non-speech classifier 220 as referred in the FIG. 2.

According to an embodiment, the non-speech classifier 220 may be referred as a sound intelligence unit, trained with non-speech audio data for detecting the occurrence of the at least one non-speech event in and around the vicinity of a user. As shown in the FIG. 4, the non-speech classifier 220 is included in a Non-Speech Processing unit 402. The non-speech processing unit further includes overlapping non-speech sound unit 404 and non-speech filter banks selection units 406.

According to embodiment, one or more IoT devices are connected in a continuous listening the IoT environment. The connected IoT devices may be referred as connected IoT devices 410. As the IoT devices are connected with each other and hence are capable to share the device status information with each other. Further, the connected IoT devices 410 are able to receive surrounding sound 414. Further, the user that interacts with the IoT device may be consider as a continuous listening IoT device 408. According to some embodiments, the IoT devices that are in the vicinity of the user may be consider the continuous listening IoT device 408.

Figure 7:
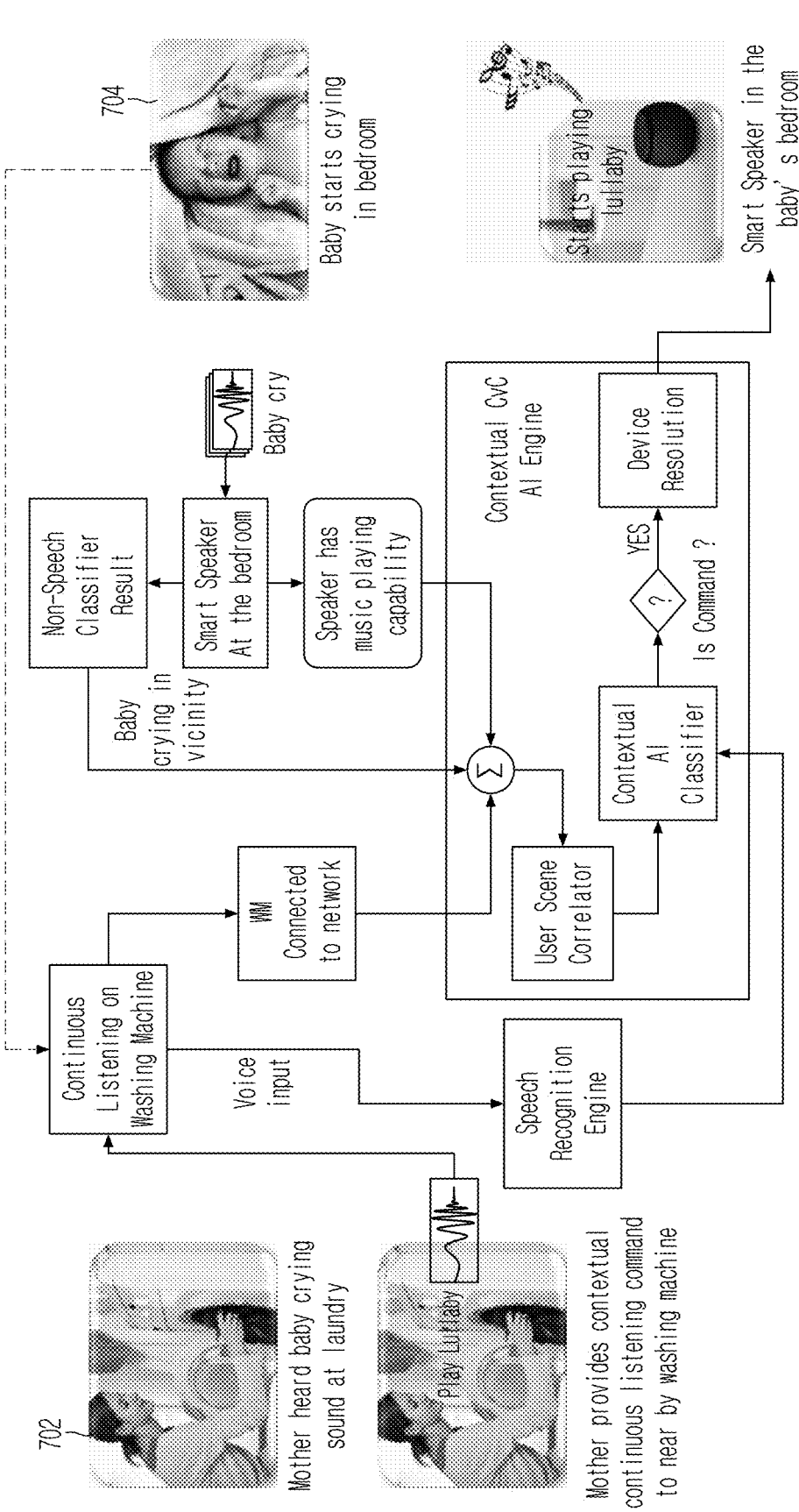
FIG. 7 illustrates an example scenario, according to an embodiment of the disclosure.

According to an embodiment, the overlapping non-speech sound unit 404 may be configured to categorize the at least one non-speech event as one or more of a domestic sound event, and an external/non-domestic sound event. Examples of the domestic sound event may include, but are not limited to, a human chatter, pet sounds, IoT device sounds, non-IoT device sounds. The non-IoT device sounds may be one of a water leak, a cooker whistle or the like. Further, the external/non-domestic sound event may be one of a vehicular-sounds, motor sounds generate while drilling and mowing, noise at public places. The vehicular sounds may be related to one of a car, a bus, a train or the like. The non-speech classifier 220 may receive active device states information from an IoT cloud to accurately classify one or more IoT devices sounds and reduce false positives in classification. Accordingly, based on the nature of the identified non-speech sound, each of it can be marked with the user attention level i.e., whether user need to give immediate attention to any of the identified sound or the user can delay or neglect it as a background noise. Thus, the one or more non-speech sounds is marked with a user attention level that indicates the degree of urgency associated with the one or more non-speech sounds. In a non-limiting example, as shown in the FIG. 7, a user 702 (mother) is interacting with a smart washing machine (WM). Meanwhile, another person (baby) 704 starts crying. According to the disclosure, the crying of the baby is categorized as non-speech sound. The disclosed system 202 further determines that non-speech sound of the baby as an urgent event to attend for the user. Further, the system 202 also determines the degree of urgency associated with the one or more non-speech sounds. An example, of the sound event occurring in a home IoT scenario and the degree of urgency level is depicted in the table 2 below.

TABLE 2

| SOUND EVENT DETECTION | | |
|---|---|---|
| NON-SPEECH SOUND EVENT | LOCATION | USER ATTENTION |
| DOORBELL | MAIN DOOR | IMMEDIATE |
| REFRIGERATOR (Normal) | KITCHEN | NEGLECT |

TABLE 2-continued

| SOUND EVENT DETECTION | | |
| --- | --- | --- |
| NON-SPEECH SOUND EVENT | LOCATION | USER ATTENTION |
| BABY CRYING | BABY BEDROOM | IMMEDIATE |
| WATER LEAK (low leak) | UTILITY AREA | DELAYED |

Figure 5:
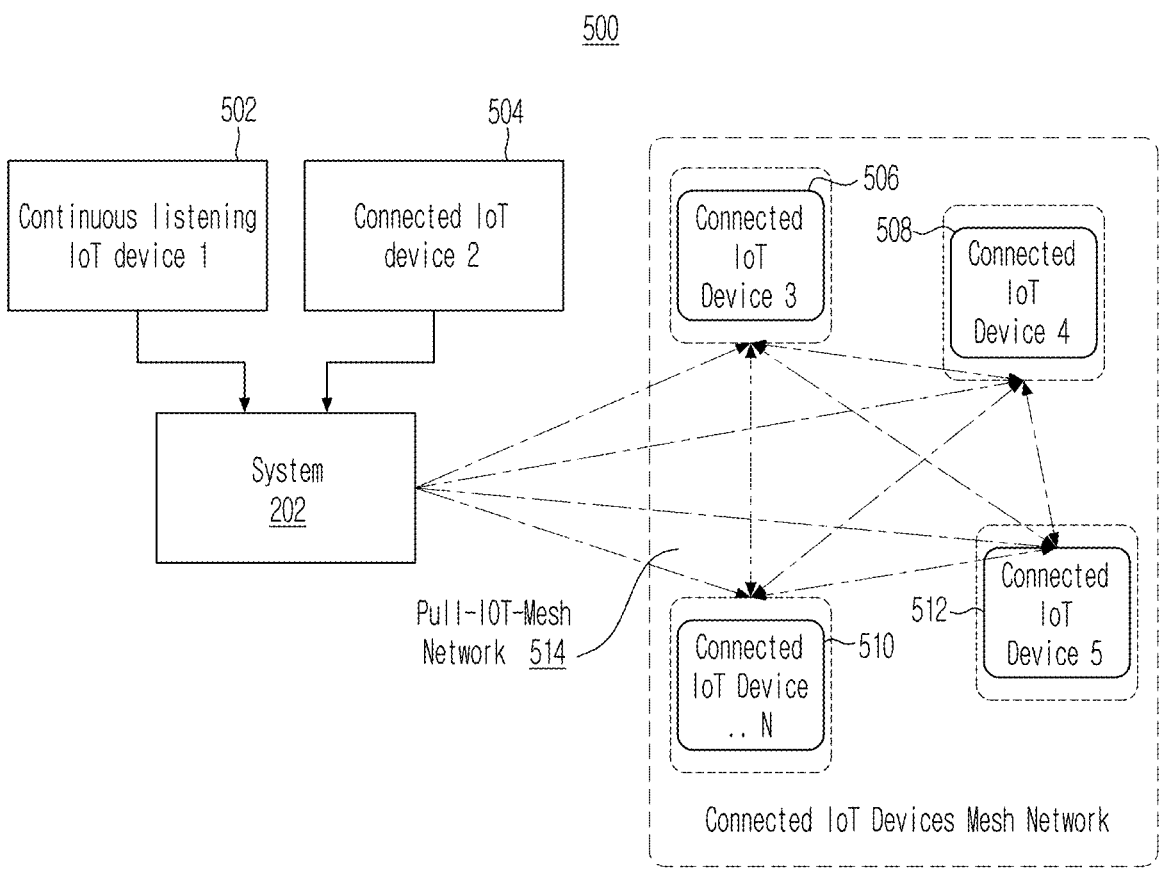
FIG. 5 illustrates a diagram depicting a number of IoT devices connected with an IoT mesh network, in accordance with an embodiment of the disclosure.

FIG. 5 illustrates a diagram 500 depicting a number of IoT devices connected with an IoT mesh network, in accordance with an embodiment of the disclosure. The IoT mesh network may also be referred as a non-hierarchical Pull-IoT-Mesh. The IoT mesh network may be dynamic to capture each non-speech event, and IoT device information input data from the number of IoT devices. Each of the number of IoT devices may interchangeably be referred as a continuous listening device. As shown in the FIG. 5, the continuous listening device IoT device 1 502, the connected device 2 504, the connected device 3 506, the connected device 4 508, the connected device 5 510, the connected device 6 512 are connected with each other in the Pull-IoT-Mesh network 514. The Pull-IoT-Mesh network 514 may be alternatively referred as a dynamic IoT mesh network without deviating from the scope of the disclosure.

According to an embodiment, the dynamic IoT mesh may be configured to capture from one or more IoT devices amongst the number of IoT devices in a continuous listening IoT environment, at least one non-speech event, a state associated with the one or more IoT devices, one or more operational capabilities associated with one or more IoT devices one or more non-speech sounds associated with the occurrence of the at least one non-speech event, a user attention associated with the one or more non-speech sounds, a location associated with the occurrence of the at least one non-speech event and a physical location of the at least one IoT device. The capture may take place upon a determination that a textual description includes a voice command. The textual description may be related to a voice input received by an IoT device from the one or more IoT devices.

Figure 6:
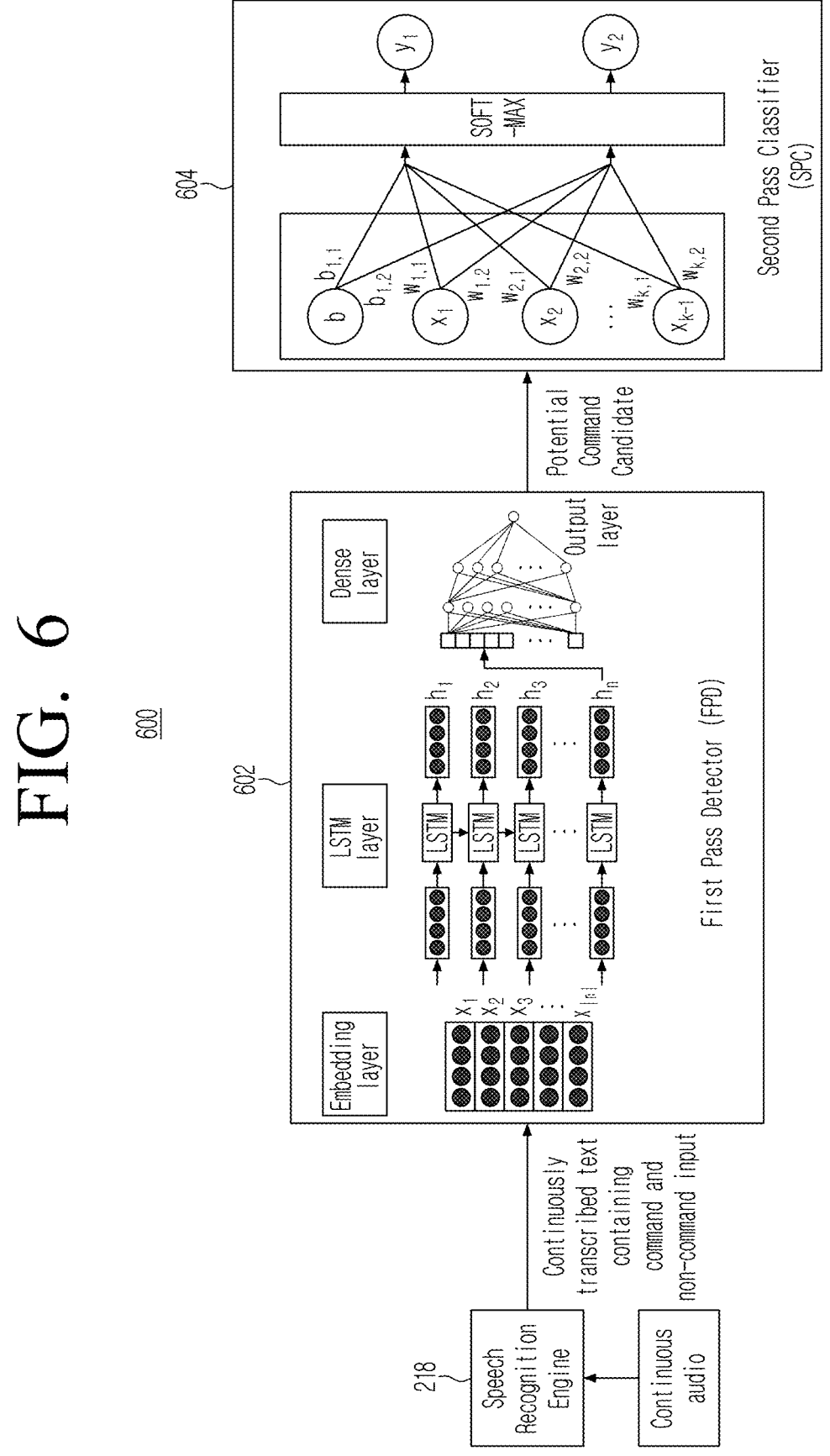
FIG. 6 illustrates an architectural diagram of the contextual engine, in accordance with an embodiment of the disclosure.

FIG. 6 illustrates an architectural diagram 600 of the contextual engine 222, in accordance with an embodiment of the disclosure. The contextual engine 222 may include a contextual classifier engine 226. According to an embodiment, the contextual classifier engine 226 identifies a relation between user input and non-speech context. The contextual classifier engine 226 include a First Pass Detector (FPD) 602, and a Second Pass Classifier (SPC) 604. The SPC 604 is a verification-based classifier module, comprises of an AI model trained with the relational dependencies between the identified intent of the voice input to the non-speech context. A detailed working of the contextual classifier engine 226 will be explained in the forthcoming paragraphs.

According to an embodiment, the FPD 602 may be configured to remove false negatives of any voice or noise being detected as a command. A first pass detection may be implemented by a combination outcome of a VAD module and an ASR module in the speech recognition engine 218 with a Machine Learning (ML) trained FPD 602. The FPD 602 may include a traditional command vs a conversation engine operating in tandem with the speech recognition engine 218. An output of the speech recognition engine 218 such as a transcribed text may be received by the FPD 602 as an input. The FPD 602 may be trained on word embedding based LSTM model to identify whether a received portion of a continuous text may be a valid candidate for command. Accordingly, the FPD 602 identifies whether any portion of a continuous text or utterance of the user or any ongoing conversation of the user includes a potential user command or not.

According to the embodiment of the disclosure, the FPD 602 of the contextual engine 222 determines a probability of presence of at least one voice command within the voice input. Referring back to the FIG. 7, and as explained above, it was determined that the baby is crying and needs immediate attention of the user (702). The user provides a user command as "play lullaby" 702. Accordingly, the user voice input of 'Play lullaby' has identified intent as 'play music' with slot value as 'lullaby', whereas identified non-speech context is 'baby crying'. According to an embodiment, the SPC 604 may be configured to evaluate the outcome of the FPD 602 by considering the user utterance, received surrounding non-speech event data, IoT devices states and capabilities to classify whether the received user utterance may be considered as a command. The ML trained SPC 604 may be typically implemented using a ML trained model. The ML trained model may use training data such as metadata information collected from non-speech events, IoT devices, states and capabilities, etc.

According to an embodiment, the SPC 604 evaluates the relationship between the identified user intent and the non-speech context to know whether there exists a correlation between them, based on a relational knowledge graph on which the AI model is trained. The relational knowledge graph corresponds to the relational table as depicted in the table 1 above. While evaluating the correlation, the SPC 604 further take into consideration of presence of near IoT devices (and their capabilities) in the vicinity of identified non-speech event location. Thus, the SPC 604 recognizes a given user input as a valid command only when the user input intent, non-speech context and IoT devices' capabilities (obtained from the correlation engine 224) produce a match with accuracy higher than a preset threshold value.

An output detection accuracy may be provided in percentage so that a real-time system may be calibrated dynamically based on various user factors such as indoor/outdoor conditions, noisy or a quite surrounding or the like to accept or reject the classification output. Accordingly, the SPC 604 provides a percentage of accuracy of the output provided by the FPD 602. Based on the example scenario as shown in the FIG. 7 table 3 depicts an output of the SPC 604 and referred as a contextual AI classifier result.

TABLE 3

| Contextual Classifier Result | | | |
| --- | --- | --- | --- |
| COMMAND | NON-SPEECH EVENT | OUTCOME | Is Command? |
| PLAY | BABY | 85% | YES |
| LULLABY | CRYING | 15% | NO |
| | (IMMEDIATE) | | |

Figure 8:
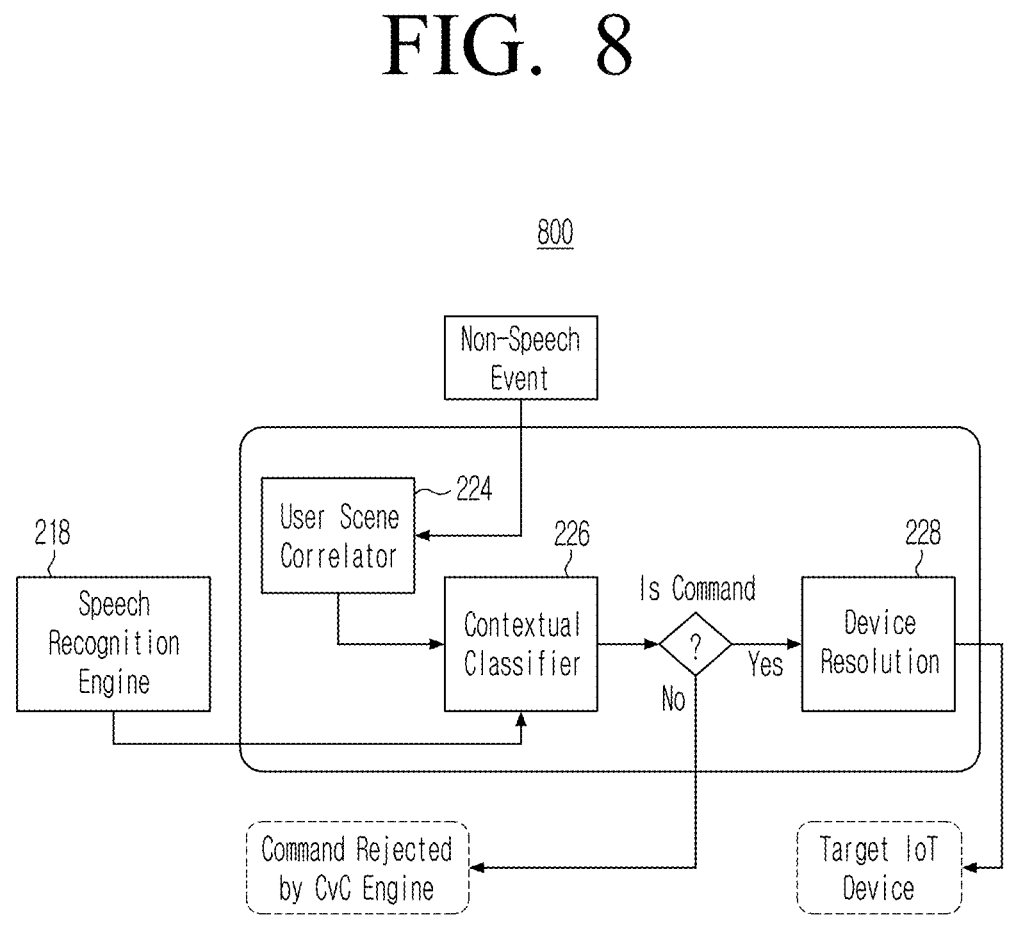

FIG. 8 illustrates an architectural diagram 800 of the device resolution engine 228, in accordance with an embodiment of the disclosure. As shown in the FIG. 8, the outputs from a speech recognition engine 218, a user scene correlation 224, a contextual classifier 226 to the device resolution 228 based on the determination that there is a presence of the voice command within the voice input. According to the example scenario as shown in the FIG. 7, the table 1 shows a list of IoT devices (as shown in the impactful capabilities column in table 1) that are capable of handling the voice command. According to the embodiment, the device resolution 228 configures the computed parameter values on identified at least one IoT device, so that the result generated is in accordance with identified non-speech event. The device resolution 228 intelligently identifies the action to be taken on at least one of the IoT devices based on identified user voice command and configure the parameter to produce impact of user response based on non-speech sound event. Table 4 depicts the output of the device resolution 228 according to the example shown in the FIG. 7. As shown in the table 4, the device resolution 228 identifies those IoT devices that are capable of playing the music and currently are in ON state.

TABLE 4

| COMMAND + NONSPEECH EVENT | NON-SPEECH EVENT LOCATION | IOT DEVICES | IOT DEVICES STATES | IOT DEVICES CAPABIL-ITIES |
|---|---|---|---|---|
| PLAY LULLABY + BABY CRYING | BEDROOM | SPEAKER | ON | MUSIC, SMART VOICE ASSISTANT |
| | | TV | OFF | MUSIC, TV, VIDEO, SMART ASSISTANT |

According to the disclosed mechanism, the disclosed system understands using non-speech data, and consider the voice input as command in continuous listening environment in that context and also executes on most appropriate device. As shown in the FIG. 7 the disclosed mechanism effectively classifies the user utterance to play lullaby as a command, and intelligently routes the action to most appropriate smart device i.e. 702 from the vicinity of non-speech sound of baby crying was detected.

FIGS. 9(9A, 9B) and 10(10A, 10B) illustrates a comparison between the related art and the disclosed mechanism. FIGS. 9 and 10 shows an example scenario depicting a comparison between an existing solution and a disclosed solution. The depicted example scenario of (9A) of FIG. 9 shows that the people are shopping at a corner of shop and having chit chat. The shop owner had identified that the corner is of the shop is poorly lit. Accordingly, the shop owner has provided contextual continuous listening command to nearby laptop which is connected to an existing system. However, the existing system fails to understand an occurrence of any non-speech event around the user. Thus, the brightness of the laptop gets increased without considering the user intent. Now according to the disclosed solution shown in the (9B) of FIG. 9 for the same scenario, the disclosed system 202 effectively understand the command, correlates the user command to the non-speech event of 'human chit-chat' at one of the corners of the shop, identifies the location of non-speech event, and smart lights brightness is increased at identified corner.

The depicted example scenario of (10A) of FIG. 10 shows that user (Dad) is playing with his kid in a living room. Another user (mom), who is in the kitchen and interacting with a smart chimney, calls out to the user (dad) in the living room. However, the user (dad) in the living room is unable to hear it due to a high noise of the chimney. The user utters that he did not hear another user (Mom) voice. However, the existing solution do not consider the non-speech events happening in and around the user. Further, smart IoT devices that are nearby to the user (dad) in the living room ignores what the user (dad) said as part of a conversation instead of acting on it. Now according to the disclosed solution shown in the (10B) of FIG. 10 for the same scenario, the disclosed system 202 effectively understand the user intent and the environment. Further, the nearby IoT devices understands the intent, considers the user reply as an implicit command instead of a conversation, and lowers a fan speed of the chimney as an effect to the user command.

While the disclosure has been particularly shown and described with reference to embodiments thereof, it will be understood that various changes in form and details may be made therein without departing from the spirit and scope of the following claims.

What is claimed is:

1. A method for identifying and executing a voice command in a continuous listening Internet of Things (IoT) environment, the method comprising:
   receiving, by at least one IoT device, a voice input in the continuous listening IoT environment;
   detecting, by the at least one IoT device while the voice input is being received, an occurrence of at least one non-speech event in a vicinity of at least one other IoT device in the continuous listening IoT environment;
   determining, by the at least one IoT device, an ambient context associated with the at least one non-speech event;
   determining, by the at least one IoT device, a correlation between the ambient context and the at least one other IoT device based on an event location of the occurrence of the at least one non-speech event;
   determining, by the at least one IoT device, presence of at least one voice command within the voice input based on the correlation; and
   executing, by the at least one IoT device, the at least one voice command, or instructing, by the at least one IoT device, the at least one other IoT device to execute the at least one voice command,
   wherein detecting the occurrence of the at least one non-speech event comprises:
   detecting at least one non-speech sound while the voice input is being received; and
   marking the at least one non-speech sound with a user attention level indicating a degree of urgency associated with the at least one non-speech sound.

2. The method as claimed in claim 1, wherein the ambient context of the at least one non-speech event is determined based on at least one of the event location, a user attention, and a type of the at least one non-speech event.

3. The method as claimed in claim 1, further comprising:
   transmitting, by continuous listening, the voice input for speech recognition upon receiving the voice input.

4. The method as claimed in claim 3, further comprising:
   generating a textual description and at least one relevant tag associated with the voice input based on performing a voice activity detection and an automatic speech recognition.

5. The method as claimed in claim 4, wherein the at least one relevant tag comprises information of a point of interest, a time, and a noun and at least one other part of speech associated with the voice input.

6. The method as claimed in claim 1, wherein the determining the correlation comprises:
   feeding, to an Artificial Intelligence (AI), the at least one non-speech event, the ambient context, and a state of the at least one other IoT device that is present at the event location based on the voice input being received; and determining, by the AI, the correlation between the ambient context and the at least one other IoT device based on the event location, an urgency associated with the at least one non-speech event and the state of the at least one other IoT device.

7. The method as claimed in claim 6, wherein the at least one non-speech event occurs at a physical location of the at least one other IoT device.

8. The method as claimed in claim 6, further comprises generating a relational table of available IoT devices that are capable of executing the at least one voice command.

9. The method as claimed in claim 1, wherein determining that the voice input comprises the at least one voice command comprises:

receiving a textual description associated with the voice input;

determining that the textual description associated with the voice input comprises the at least one voice command or not;

evaluating, based on determining that the textual description associated with the voice input is the at least one voice command, the textual description associated with the voice input, the at least one non-speech event, a first state of the at least one IoT device, a second state of the at least one other IoT device, and a first capability associated with each of the at least one IoT device, and a second capability associated with the at least one other IoT device; and generating a probable outcome indicating that the voice input comprises the at least one voice command based on the evaluating.

10. The method as claimed in claim 9, wherein the voice input, non-speech data, the first state and the second state, and the first capability and the second capability are fetched from a dynamic IoT mesh.

11. The method as claimed in claim 9, further comprising:

capturing, by a dynamic IoT mesh upon determining that the textual description is the voice command from the at least one IoT device in the continuous listening IoT environment, the at least one non-speech event, the first state, at least one operational capability associated with the at least one IoT device, at least one non-speech sound associated with the occurrence of the at least one non-speech event, a user attention associated with the at least one non-speech sound, the event location, and a physical location of the at least one IoT device.

12. The method as claimed in claim 1, wherein the at least one non-speech event is an event with a degree of urgency where a non-speech sound is produced in the continuous listening IoT environment by at least one of a person, an animal, a device, and a machine.

13. The method as claimed in claim 1, wherein the occurrence of the at least one non-speech event in a vicinity of the at least one other IoT device is based on at least one non-speech sound in the continuous listening IoT environment.

14. A system for identifying and executing a voice command in a continuous listening Internet of Things (IoT environment), the system comprising:

at least one IoT device configured to receive a voice input in the continuous listening IoT environment, the at least one IoT device comprising:

a memory storing instructions; and at least one processor operatively connected to the memory and configured to execute the instructions to:

receive the voice input in the continuous listening IoT environment;

detect, while the voice input is being received, an occurrence of at least one non-speech event in a vicinity of the at least one other IoT device in the continuous listening IoT environment, wherein the at least one non-speech event is detected;

determine an ambient context associated with the at least one non-speech event;

determine a correlation between the ambient context and the at least one other IoT device based on an event location of the occurrence of the at least one non-speech event;

determine presence of at least one voice command within the voice input based on the correlation; and execute the at least one voice command, or instruct the at least one other IoT device to execute the at least one voice command, wherein the occurrence of the at least one non-speech event is detected by:

detecting at least one non-speech sound while the voice input is being received; and marking the at least one non-speech sound with a user attention level indicating a degree of urgency associated with the at least one non-speech sound.

\* \* \* \* \*